United States Patent
Weng et al.

(10) Patent No.: US 12,307,637 B2
(45) Date of Patent: May 20, 2025

(54) IMAGE EXPOSURE ADJUSTMENT METHOD AND APPARATUS, DEVICE, AND STORAGE MEDIUM

(71) Applicant: ZHEJIANG UNIVIEW TECHNOLOGIES CO., LTD., Zhejiang (CN)

(72) Inventors: Zhewen Weng, Zhejiang (CN); Wenhui Zhang, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 260 days.

(21) Appl. No.: 17/791,800

(22) PCT Filed: Sep. 25, 2020

(86) PCT No.: PCT/CN2020/117835
§ 371 (c)(1),
(2) Date: Jul. 8, 2022

(87) PCT Pub. No.: WO2021/147364
PCT Pub. Date: Jul. 29, 2021

(65) Prior Publication Data
US 2023/0056296 A1  Feb. 23, 2023

(30) Foreign Application Priority Data

Jan. 22, 2020  (CN) .................. 202010074188.X

(51) Int. Cl.
G06T 5/92    (2024.01)
G06T 3/40    (2024.01)
G06T 5/70    (2024.01)
G06T 7/194   (2017.01)
G06V 40/16   (2022.01)

(52) U.S. Cl.
CPC .................. *G06T 5/92* (2024.01); *G06T 3/40* (2013.01); *G06T 5/70* (2024.01); *G06T 7/194* (2017.01);
(Continued)

(58) Field of Classification Search
CPC .... G06T 5/92; G06T 3/40; G06T 5/70; G06T 7/194; G06T 2207/30201; G06T 5/94;
(Continued)

(56) References Cited

U.S. PATENT DOCUMENTS 11,216,925 B2 *  1/2022  Zhang ................. H04N 23/60
11,265,459 B2 *  3/2022  Gnatyuk .............. G06T 5/40
(Continued)

FOREIGN PATENT DOCUMENTS

CN    1997113 A    7/2007
CN  101202841 A    6/2008
(Continued)

OTHER PUBLICATIONS

Supplementary Partial European Search Report for Application No. 20916213.0, dated Jan. 22, 2024, 14 pages.
(Continued)

Primary Examiner — Stephen R Koziol
Assistant Examiner — Benedict E Lee
(74) Attorney, Agent, or Firm — Morgan, Lewis & Bockius LLP

(57) ABSTRACT

Provided are an image exposure adjustment method and apparatus, a device, and a medium. The image exposure adjustment method includes performing human body detection on a collected image; in a case where a human body is detected, segmenting the image to determine a foreground region and a background region in the image; determining a mask image according to the foreground region and the background region; and determining an exposure weight
(Continued)

table according to the mask image, and performing exposure value adjustment on the image according to the exposure weight table.

20 Claims, 5 Drawing Sheets

(52) U.S. Cl.
CPC .. *G06V 40/166* (2022.01); *G06T 2207/30201* (2013.01)

(58) Field of Classification Search
CPC ........... G06T 7/11; G06T 7/155; G06V 40/16; G06V 40/166; G06V 10/25; G06V 10/26; G06V 10/267; G06V 10/60; G06V 40/10; G06V 40/103; G06V 40/161; H04N 23/71; H04N 23/76; H04N 23/611; H04N 23/73
See application file for complete search history.

(56) References Cited

U.S. PATENT DOCUMENTS

| | | |
|---|---|---|
| 2005/0271379 A1 | 12/2005 | Lee |
| 2007/0216777 A1 | 9/2007 | Quan et al. |
| 2017/0230558 A1 * | 8/2017 | Morales ................. H04N 25/60 |
| 2020/0195828 A1 * | 6/2020 | Reyserhove ......... H04N 25/535 |
| 2020/0322519 A1 * | 10/2020 | Fujisawa ................ G03B 15/00 |

FOREIGN PATENT DOCUMENTS

| | | | | |
|---|---|---|---|---|
| CN | 103077423 A | | 5/2013 | |
| CN | 106682620 A | | 5/2017 | |
| CN | 107241558 A | * | 10/2017 | ........... H04N 5/2351 |
| CN | 107633485 A | | 1/2018 | |
| CN | 108702452 A | | 10/2018 | |
| CN | 109918993 A | | 6/2019 | |
| CN | 110710194 A | | 1/2020 | |
| JP | H03217808 A | | 9/1991 | |
| JP | 5519460 B2 | * | 6/2014 | ............. H04N 23/70 |
| TW | 201533704 A | | 9/2015 | |
| WO | WO-2019045521 A1 | * | 3/2019 | ............... G03B 7/00 |

OTHER PUBLICATIONS

English translation of Chinese Search Report for Application No. 202010074188.X, date unknown, 2 pages.
International Search Report for Application No. PCT/CN2020/117835, dated Dec. 8, 2020, 5 pages including English translation.

* cited by examiner

IMAGE EXPOSURE ADJUSTMENT METHOD AND APPARATUS, DEVICE, AND STORAGE MEDIUM

CROSS-REFERENCE TO RELATED APPLICATIONS

This is a National Stage Application filed under 35 U.S.C. 371 based on International Patent Application No. PCT/CN2020/117835, filed on Sep. 25, 2020, which claims priority to Chinese Patent Application No. 202010074188.X filed with the China National Intellectual Property Administration (CNIPA) on Jan. 22, 2020, the contents of which are incorporated herein by reference in their entireties.

TECHNICAL FIELD

The present disclosure relates to the field of image processing technologies, for example, to an image exposure adjustment method and apparatus, a device, and a medium.

BACKGROUND

Facial recognition technology is a technology to perform face analysis and recognition on faces by collecting images containing faces using cameras and automatically detecting the faces in the images, and the technology has been widely applied to face authentication, monitoring, human-machine interaction and other fields. For example, an access control machine based on facial recognition compares the faces in the collected face images with the face database and executes the entry action according to facial recognition results.

In the process of facial recognition, due to the shooting environment and other factors, the face imaging effect is poor, which makes the accuracy of facial recognition greatly reduced. For example, when the background light is too bright, the face will be too dark. In the related art, for the problem of the poor face imaging effect caused by the environment factor, a preset automatic adjustment algorithm is often adopted to adjust image parameters to improve the face imaging quality. For example, an exposure evaluation value is calculated based on the entire image using the automatic exposure algorithm, the exposure evaluation value is compared with the ideal exposure value, and the exposure parameter adjustment method is determined according to the comparison result to adjust the exposure value of the camera, so that the face exposure in the face image becomes normal.

However, under special conditions, the above-described manner still leads to abnormal face imaging in face images. For example, in extreme backlight scenes, the faces are easily underexposed, which makes the collected face too dark or even makes it impossible to detect the face, resulting in the poor face imaging effect. In this manner, the facial recognition performance cannot be guaranteed.

SUMMARY

Embodiments of the present application provides an image exposure adjustment method and apparatus, a device, and a medium, to solve the problem of low facial recognition performance due to the poor face imaging effect under special conditions.

An image exposure adjustment method is provided. The method includes the steps described below.

Human body detection is performed on a collected image.

In a case where a human body is detected, the image is segmented to determine a foreground region and a background region in the image.

A mask image is determined according to the foreground region and the background region.

An exposure weight table is determined according to the mask image, and exposure value adjustment is performed on the image according to the exposure weight table.

An image exposure adjustment apparatus is provided. The apparatus includes a human body detection module, an image segmenting module, an image determination module and an image adjustment module.

The human body detection module is configured to perform human body detection on a collected image.

The image segmenting module is configured to, in a case where a human body is detected, segment the image to determine a foreground region and a background region in the image.

The image determination module is configured to determine a mask image according to the foreground region and the background region.

The image adjustment module is configured to determine an exposure weight table according to the mask image, and perform exposure value adjustment on the image according to the exposure weight table.

An electronic device is further provided.

The electronic device includes one or more processors and a storage apparatus, configured to store one or more programs.

The one or more programs, when executed by the one or more processors, cause the one or more processors to perform the image exposure adjustment method as described below.

A computer-readable storage medium is provided. The computer-readable storage medium is configured to store a computer program, and the program, when executed by a processor, performs the image exposure adjustment method as described below.

DETAILED DESCRIPTION

The present disclosure is described below in conjunction with drawings and embodiments.

Figure 1:
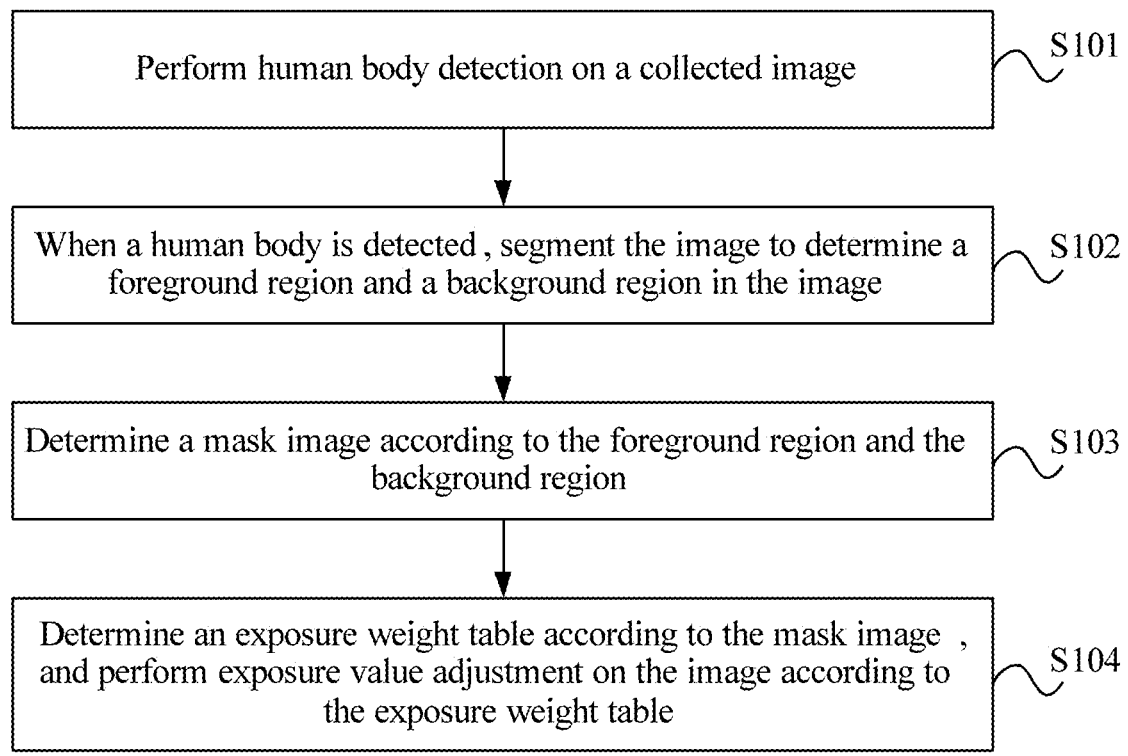
FIG. 1 is a flowchart of an image exposure adjustment method according to an embodiment of the present disclosure.

FIG. 1 is a flowchart of an image exposure adjustment method according to an embodiment of the present disclosure. This embodiment of the present disclosure is suitable for the case of performing exposure value adjustment on a collected image. The method may be performed by an image exposure adjustment apparatus. The apparatus may be implemented in software and/or hardware and may be configured in an electronic device. The image exposure adjustment method includes S101, S102, S103 and S104.

In S101, human body detection is performed on a collected image.

In this embodiment of the present disclosure, an image may be collected based on a camera or a device with a camera, and then the human body detection is performed on the collected image.

For example, the human body detection may be performed on the collected image according to a moving object detection algorithm or other manners, which is not limited herein.

In S102, when a human body is detected, the image is segmented to determine a foreground region and a background region in the image.

The foreground region is the region where the human body is located, and the background region is another region except the human body.

The image may be segmented using different manners to determine the foreground region and the background region in the image. For example, the image may be segmented by a frame difference method, a Gaussian mixture model or a hidden Markov model, which is not limited herein.

When the image is segmented by the frame difference method, the obtained foreground region is a human contour and may have "ghosts", but when the image is segmented multiple times by the frame difference method, the "ghosts" can be effectively eliminated. Therefore, in this embodiment of the present disclosure, the image may be segmented multiple times by the frame difference method, for example, the image is segmented three times by the frame difference method, so as to eliminate the "ghosts", and then the obtained human body contour is filled through contour fitting to obtain the foreground region and the background region.

Compared with the frame difference method, the Gaussian mixture model has a faster speed to segment the image and does not need to execute the contour fitting operation. Therefore, this embodiment of the present disclosure adopts the Gaussian mixture model to segment the image to determine the foreground region and the background region in the image.

When the image is segmented by the Gaussian mixture model, the image is inputted into a preset Gaussian mixture model to determine a probability value of each pixel point in the image, then the probability value of each pixel point is compared with a probability threshold, each pixel point is determined as a foreground point or a background point according to the comparison result, and after the foreground points and the background points are determined, the region where the foreground points are located is determined as the foreground region, and the region where the background points are located is determined as the background region.

If the probability value of any pixel point is less than or equal to the probability threshold, the pixel point is determined as the foreground point; and if the probability value of any pixel point is greater than the probability threshold, the pixel point is determined as the background point. The preset Gaussian mixture model is generated based on training samples.

In the implementation, the probability value of each pixel point in the image may be determined by the preset Gaussian mixture model represented by formula (1):

$$P(x_i) = \sum_{j=1}^{M} \alpha_j N_j\left(x_i; \mu_j, \sum_j\right). \quad (1)$$

In the above formula, $P^{(x_i)}$ is the probability value of the $i^{th}$ pixel point in the image, $x_i$ is the $i^{th}$ pixel point, i is an integer greater than 1, j is the $j^{th}$ single Gaussian model, M is the total number of single Gaussian models, M is an integer greater than or equal to 2, $\alpha_j$ is the weight of the $j^{th}$ single Gaussian model, where $$\sum_{j=1}^{M} \alpha_j = 1, N_j\left(x_i; \mu_j, \sum_j\right)$$

is the probability density function of the $j^{th}$ single Gaussian model, $\mu_j$ is the mean of the $j^{th}$ single Gaussian model, and $\Sigma_j$ is the variance of the $j^{th}$ single Gaussian model, where $$N_j\left(x_i; \mu_j, \sum_j\right) = \frac{1}{\sqrt{(2\pi)|\sum_j|}} \exp\left[-\frac{(x_i - \mu_j)^2}{2(\sum_j)^2}\right].$$

Before each pixel point in the image is determined to be a foreground point or a background point by using formula (1), the weight, mean and variance of each single Gaussian model in the preset Gaussian mixture model need to be determined.

As an implementation mode, the weight, mean and variance of each single Gaussian model may be obtained by constructing a likelihood function and solving the likelihood function.

First, a likelihood function is constructed based on the preset Gaussian mixture model, and the likelihood function is logged to obtain a log-likelihood function represented by formula (2):

$$L\left(\alpha_j, \mu_j, \sum_j\right) = \sum_{i=1}^{W} \log\left\{\sum_{j=1}^{M} \alpha_j N_j\left(x_i; \mu_j, \sum_j\right)\right\}. \quad (2)$$

In the above formula, L ($\alpha_j$, $\mu_j$, $\Sigma_j$) is the log-likelihood function, j is the $j^{th}$ single Gaussian model, M is the total number of single Gaussian models, M is an integer greater than or equal to 2, $\alpha_j$ is the weight of the $j^{th}$ single Gaussian model, where $$\sum_{j=1}^{M} \alpha_j = 1, N_j\left(x_i; \mu_j, \sum_j\right)$$

is the probability density function of the $j^{th}$ single Gaussian model, $\mu_j$ is the mean of the $j^{th}$ single Gaussian model, $\Sigma_j$ is the variance of the $j^{th}$ single Gaussian model, $x_i$ is the $i^{th}$ pixel point, i is an integer greater than 1, W is the total of pixel points, and W is an integer greater than 2.

Second, the log-likelihood function is solved to determine the weight, mean and variance of each single Gaussian model.

The implementation process includes the steps described below.

In S1, the posterior probability of each pixel point is calculated according to the initial weight, initial mean and initial variance of the $k^{th}$ single Gaussian model.

The posterior probability of each pixel point may be calculated by using formula (3):

$$\gamma(x_i, k) = \frac{\alpha_k N_k\left(x_i; \mu_k, \sum_k\right)}{\sum_{j=1}^{M} \alpha_j N_j\left(x_i; \mu_j, \sum_j\right)}. \quad (3)$$

In the above formula, $\gamma(x_i, k)$ is the posterior probability of the $i^{th}$ pixel point, $x_i$ is the $i^{th}$ pixel point, k is the $k^{th}$ single Gaussian model, $\alpha_k$ is the initial weight of the $k^{th}$ single Gaussian model, $N_k(x_i; \mu_k, \Sigma_k)$ is the probability density function of the $k^{th}$ single Gaussian model, $\mu_k$ is the initial mean of the $k^{th}$ single Gaussian model, $\Sigma_k$ is the initial variance of the $k^{th}$ single Gaussian model, j is the $j^{th}$ single Gaussian model, M is the total number of single Gaussian models, M is an integer greater than or equal to 2, $\alpha_j$ is the weight of the $j^{th}$ single Gaussian model, where $$\sum_{j=1}^{M} \alpha_j = 1, N_j\left(x_i; \mu_j, \sum_j\right)$$

is the probability density function of the $j^{th}$ single Gaussian model, $\mu_j$ is the mean of the $j^{th}$ single Gaussian model, and $\Sigma_j$ is the variance of the $j^{th}$ single Gaussian model, where $$N_j\left(x_i; \mu_j, \sum_j\right) = \frac{1}{\sqrt{(2\pi)|\sum_j|}} \exp\left[-\frac{(x_i - \mu_j)^2}{2(\sum_j)^2}\right].$$

In S2, the new mean, new variance and new weight of each single Gaussian model are calculated according to the posterior probability estimated in S1. That is, the parameter value corresponding to the maximum likelihood function is calculated.

The new mean, new variance and new weight of each single Gaussian model are calculated by using formula (4):

$$\begin{cases} \mu_k' = \frac{1}{W_k}\sum_{i=1}^{W}\gamma(x_i, k)x_i \\ \sum_k' = \frac{1}{W_k}\sum_{i=1}^{W}\gamma(x_i, k)(x_i - \mu_k')(x_i - \mu_k')^T \\ \alpha_k' = \frac{W_k}{W} \end{cases} \quad (4)$$

In the above formula, $W_k$ is the number of points belonging to the clustering of the $k^{th}$ single Gaussian model, $W_k = \sum_{i=1}^{W} \gamma(x_i, k)$, $\mu_k$ is the new mean, W is the total of pixel points, $\gamma(x_i, k)$ is the posterior probability of the $i^{th}$ pixel point, $x_i$ is the $i^{th}$ pixel point, $\Sigma_k$ is the new variance, and $\alpha_k$ is the new weight.

In S3, S1-S2 are repeatedly performed until the likelihood function converges to obtain the optimal weight, optimal mean and optimal variance of each single Gaussian model, and the optimal weight, optimal mean and optimal variance of each single Gaussian model are used as the weight, mean and variance of the single Gaussian model to obtain the preset Gaussian mixture model.

The image is segmented according to the preset Gaussian mixture model obtained according to the above manner to determine the foreground region and the background region in the image.

In this embodiment of the present disclosure, the manner of obtaining the preset Gaussian mixture model is illustrative. In addition, the preset Gaussian mixture model may be obtained in other manners, as long as the image segmentation can be achieved and the foreground region and the background region in the image can be determined, which is not limited herein.

In S103, a mask image is determined according to the foreground region and the background region.

Due to the image segmentation, the obtained foreground region and background region in the image may have noise, so that the mask image generated based on the foreground region and background region having noise is poor in quality. In this embodiment of the present disclosure, the denoising processing may be first performed on the foreground region and the background region, and the binarization processing may be performed on the foreground region and background region that are obtained after the denoising processing, to obtain the mask image with less noise. The denoising processing includes filtering processing, erosion processing and dilation processing.

In the implementation, the filtering processing may be first performed on the foreground region and the background region, then the erosion processing is performed on the foreground region and background region that are obtained after the filtering processing, and finally, the dilation processing is performed on the foreground region and background region that are obtained after the erosion processing, to obtain the denoised foreground region and background region. The binarization processing is performed on the denoised foreground region and background region to obtain the mask image. In this embodiment, the filtering algorithm adopted in the filtering process may be a median filtering algorithm, a mean filtering algorithm or other algorithms, which is not limited herein. In an embodiment, the median filtering algorithm is used in the filtering processing.

In this embodiment of the present disclosure, the isolated and dense noise in the foreground region and the background region can be eliminated through the median filtering algorithm. After the denoising processing is performed using the median filtering algorithm, the noise may also exist in the foreground region and the background region, and then the erosion algorithm in morphological processing is used for eliminating the noise again. However, the void phenomenon may occur at this point. Therefore, the foreground region and background region that are obtained after the erosion processing may be processed again using a dilation algorithm to obtain a smooth mask image, so as to obtain a mask image with good quality.

Figure 2:
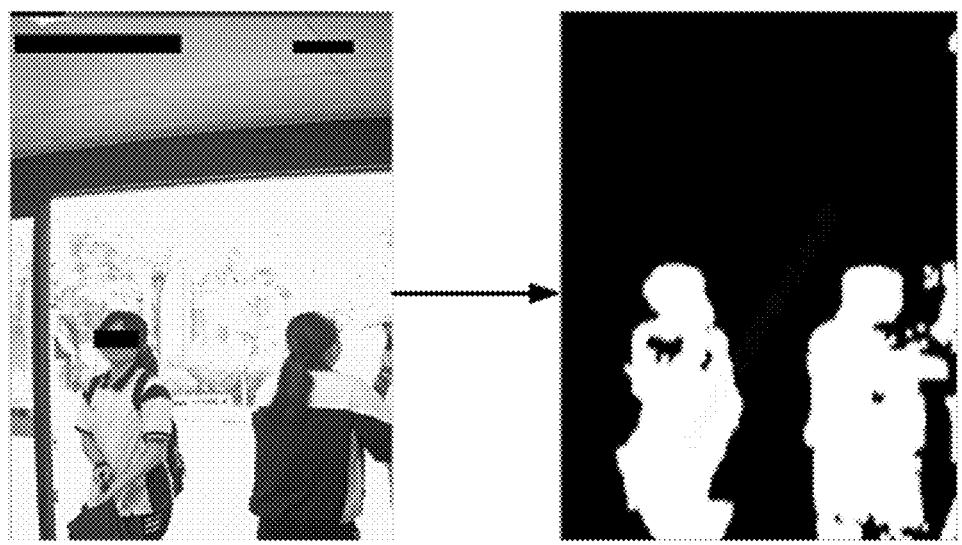
FIG. 2 is a schematic diagram of a mask image according to an embodiment of the present disclosure.

In this embodiment of the present disclosure, the mask image may be obtained by performing the denoising processing and the binarization processing on the foreground region and the background region. The pixel value of the pixel point in the foreground region is set to 1, and the pixel value of the pixel point in the background region is set to 0. For example, as shown in FIG. 2, after the denoising process and the binarization process are performed on the foreground region and the background region, a mask image is obtained.

In S104, an exposure weight table is determined according to the mask image, and exposure value adjustment is performed on the image according to the exposure weight table.

In an embodiment, the mask image may be processed by an image signal processor (ISP) based on the data size set by the ISP. Then, the ISP analyzes the mask data corresponding to the processed mask image to count the numbers of different types of pixel points in each pixel unit in the processed mask image, determines the ratio of the number of a preset type of pixel points in a pixel unit to the total number of pixel points in the pixel unit, determines the exposure weight of each pixel unit according to the ratio, and then obtains the exposure weight table. After the exposure weight table is obtained, the exposure value adjustment may be performed on the image according to the exposure weight table. Each pixel unit includes at least two pixel points.

In this embodiment of the present disclosure, in addition to the exposure value weight table being determined, other image parameters may be determined, such as contrast or a high-dynamic range (HDR) parameter. Correspondingly, the step in which the image is adjusted according to the determined image parameter includes: the contrast or the HDR parameter is adjusted.

In this embodiment of the present disclosure, the exposure value adjustment is performed on the collected image having a human body so that whether there is a face can be easily detected based on the adjusted image, so as to accurately adjust the detected face, thereby improving the face image quality and the facial recognition performance (speed and accuracy).

In the image exposure adjustment method provided by this embodiment of the present disclosure, the human body detection is performed on a collected image; when a human body is detected, the image is segmented to determine a foreground region and a background region in the image; a mask image is determined according to the foreground region and the background region; and an exposure weight table is determined according to the mask image, and the exposure value adjustment is performed on the image according to the exposure weight table. Therefore, the problem of low facial recognition performance due to the poor face imaging effect under special conditions is solved. Before facial recognition is performed on the collected image, the exposure weight table is determined based on the human body in the image, and the exposure value adjustment is performed on the image using the exposure weight table, so that the face can be easily detected in the adjusted image, so as to improve the face detection rate, thereby improving the facial recognition performance.

On the basis of the technical scheme described above, this embodiment of the present disclosure also has another situation. For example, when the human body detection is performed on the collected image, whether a face exists in the image may also be detected after the human body is detected, the face region is used as a metering region when a face exists, an exposure adjustment parameter is determined, and then the exposure value adjustment is performed on the image according to the exposure adjustment parameter.

In this embodiment, the face detection performed on the image may be achieved using a face detection algorithm or a face detection model, which is not limited herein. The face detection algorithm refers to any algorithm that can detect faces, and the face detection model refers to any model that can detect faces, which is not limited herein.

When a face is detected in the image, and the region where the detected face is located is used as a metering region and the exposure adjustment parameter is determined, an exposure evaluation value may be calculated using an automatic adjustment algorithm preset in the ISP according to a target region, the exposure evaluation value is compared with an ideal exposure value, an exposure adjustment parameter is determined according to the comparison result, and then the exposure value of the image is adjusted according to the exposure adjustment parameter. The step in which the exposure value of the image is adjusted includes: the exposure value is increased, the exposure value is decreased or the exposure value is not adjusted.

That is, after the human body in the image is detected, whether a face exists in the image is detected, the face region may be processed as a target region if a face exists, and the exposure adjustment parameter is determined, without performing operations such as the image segmentation, the determination of the foreground region and the background region in the image, the determination of the mask image and the determination of the exposure weight table based on the mask image, thereby improving the facial recognition performance.

Figure 3:
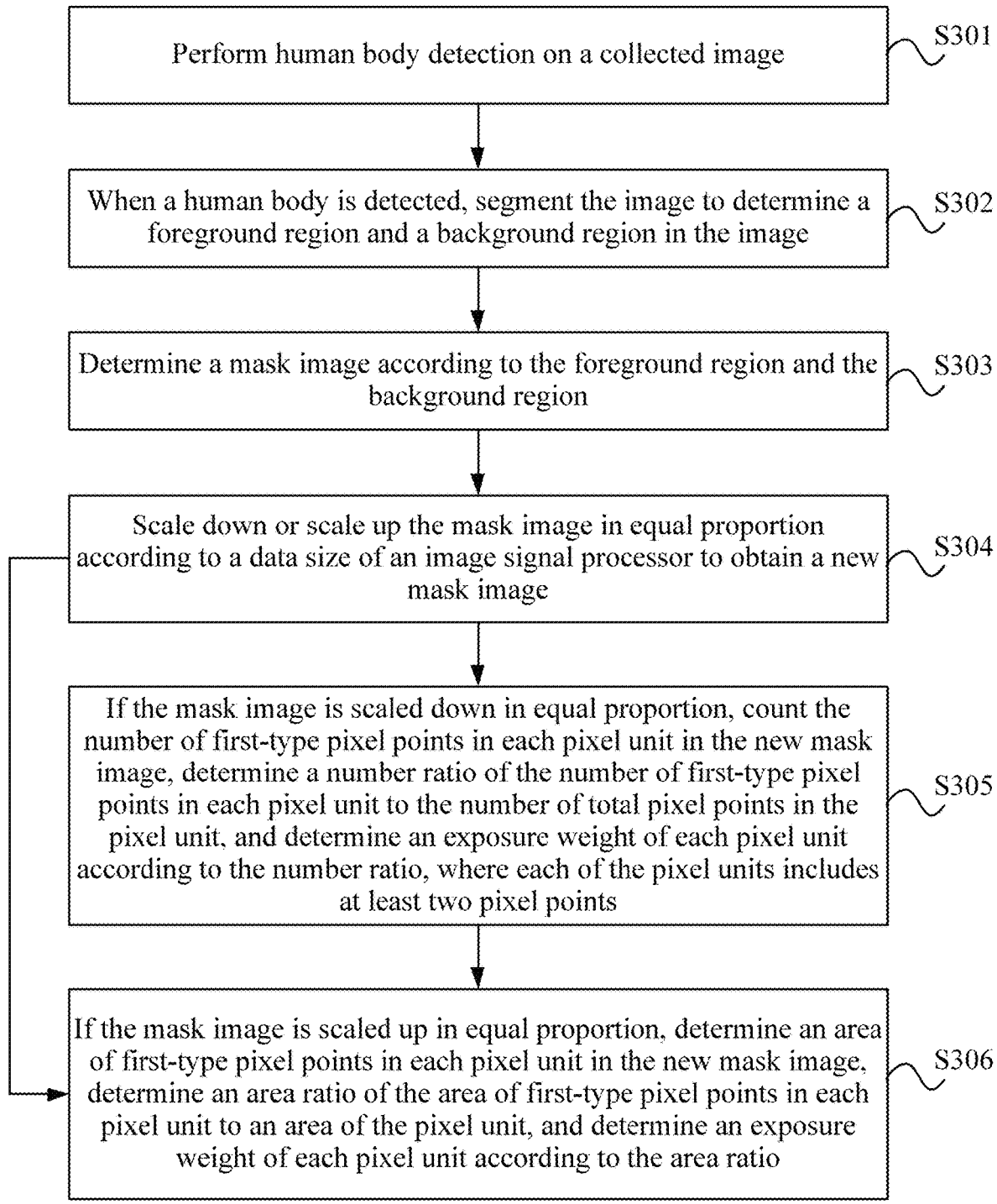
FIG. 3 is a flowchart of another image exposure adjustment method according to an embodiment of the present disclosure.

FIG. 3 is a flowchart of another image exposure adjustment method according to an embodiment of the present disclosure. This embodiment is described on the basis of the preceding embodiment, and the operations related to the step in which the exposure weight table is determined according to the mask image are added. As shown in FIG. 3, the method includes S301, S302, S302, S303, S304, S305 and S306.

In S301, human body detection is performed on a collected image.

In S302, when a human body is detected, the image is segmented to determine a foreground region and a background region in the image.

In S303, a mask image is determined according to the foreground region and the background region.

In S304, the mask image is scaled down or scaled up in equal proportion according to a data size of an image signal processor to obtain a new mask image.

The mask data corresponding to the mask image is huge and is generally a two-dimensional array of A*B, where A and B are usually greater than 200, but the data size that the ISP can process is generally determined based on the ISP type, and at this point, there is a case that the data size that the ISP can process is smaller than or larger than the size of the mask image data. Therefore, in this embodiment of the present disclosure, the mask image may be scaled down or scaled up in equal proportion according to the data size of the ISP to obtain a new mask image, thereby laying a foundation for the subsequent determination of the exposure weight table according to the new mask image.

For example, the mask image may be scaled down or scaled up in equal proportion by using formula (5):

$$\frac{DstHigh}{SrcHigh} \cong \frac{DstWide}{SrcWide}. \tag{5}$$

In the above formula, DstHigh is the data height of the image signal processor, SrcHigh is the mask data height corresponding to the mask image, DstWide is the data width of the image signal processor, and SrcWide is the mask data width corresponding to the mask image.

For example, if the data size of the image signal processor is 20*30 and the mask data size corresponding to the mask image is 200*300, the mask data size corresponding to the mask image is scaled down from 200*300 to 20*30.

For example, if the data size of the image signal processor is 300*300 and the mask data size corresponding to the mask image is 200*300, the mask data size corresponding to the mask image is scaled up from 200*300 to 300*300.

In S305, if the mask image is scaled down in equal proportion, the number of first-type pixel points in each pixel unit in the new mask image is counted, the number ratio of the number of first-type pixel points in each pixel unit to the number of total pixel points in the pixel unit is determined, and an exposure weight of each pixel unit is determined according to the number ratio, where each pixel unit includes at least two pixel points.

When the mask image is scaled down, multiple pixel points in the mask image are classified into one pixel unit, and the types of multiple pixel points in one pixel unit may be different. The pixel point types include a first type and a second type, the pixel value of the first-type pixel point is 1, and the pixel value of the second-type pixel point is 0.

With the example in S304 for description, that is, the mask data size corresponding to the mask image is 200*300 and the mask data size corresponding to the new mask image is 20*30, it means that every 100 pixel points in the mask data corresponding to the new mask image are classified into one pixel unit, and the pixel value of each pixel point in each pixel unit is 1 or 0.

In this embodiment of the present disclosure, the number of the first-type pixel points in each pixel unit in the new mask image may be counted. After the number of the first-type pixel points in each pixel unit in the new mask image is counted, the ratio of the number of the first-type pixel points in each pixel unit to the total number of pixel points in each pixel unit may be determined. For example, if a pixel unit Q has 100 pixel points, among which 65 pixel points are first-type pixel points and 35 pixel points are second-type pixel points, the ratio of the number of the first-type pixel points to the total number of pixel points in the pixel unit Q is determined to be 0.65.

The exposure weight of each pixel unit is determined according to the number ratio. For example, in this embodiment of the present disclosure, the number ratio of the number of the first-type pixel points in a pixel unit to the total number of pixel points in the pixel unit may be compared with a number ratio threshold, to determine the exposure weight of each pixel unit according to the comparison result. If the number ratio of the number of the first-type pixel points in any pixel unit to the total number of pixel points in the pixel unit is greater than the number ratio threshold, the exposure weight of the pixel unit is reset to a first value; and if the number ratio of the number of the first-type pixel points in any pixel unit to the total number of pixel points in the pixel unit is less than or equal to the number ratio threshold, the exposure weight of the pixel unit is reset to a second value. In this embodiment, the number ratio threshold may be set according to actual requirements, such as 0.8, 0.9, or 0.95.

The first value may be set according to actual requirements, for example, 1, and the corresponding second value may be set to a value different from the first value, for example, 0.

When the facial recognition is performed using a face image, the face region usually belongs to the region of interest and is generally located in the target region of the image, such as the middle and lower region of the image. Therefore, in this embodiment of the present disclosure, when the exposure weight of each pixel unit is determined, whether the pixel unit is located in the target region of the image may also be determined. If any pixel unit is located in the target region of the image and the number ratio of the number of the first-type pixel points in the pixel unit to the total number of pixel points in the pixel unit is greater than the number ratio threshold, the exposure value of the pixel unit is set to a third value. The third value is greater than the first value and different from the second value. For example, when the first value is 1 and the second value is 0, the third value may be set to 3.

In S306, if the mask image is scaled up in equal proportion, the area of first-type pixel points in each pixel unit in the new mask image is determined, the area ratio of the area of first-type pixel points in each pixel unit to the area of the pixel unit is determined, and an exposure weight of each pixel unit is determined according to the area ratio.

When the mask image is scaled up in equal proportion, one pixel point in the mask image may be classified into one pixel unit or two pixel units. The type of the pixel point may be a first type or a second type. When the pixel point is a first-type pixel point, the pixel value of the pixel point is 1; and when the pixel point is a second-type pixel point, the pixel value of the pixel point is 0.

In this embodiment of the present disclosure, the area of the first-type pixel points in each pixel unit in the new mask image is determined, and the area ratio of the area of the first-type pixel points in each pixel unit to the area of the pixel unit is determined. For example, if the area of the first-type pixel points in the pixel unit Q is 1 square millimeter (mm$^2$) and the area of the pixel unit Q is 1.5 mm$^2$, the area ratio of the area of the first-type pixel points to the area of the pixel unit Q is determined to be 0.67. The area of the first-type pixel points in each pixel unit may be determined using an existing area calculation method, which is not limited herein.

The exposure weight of each pixel unit is determined according to the area ratio. For example, in this embodiment of the present disclosure, the area ratio of the area of the first-type pixel points in a pixel unit to the area of the pixel unit may be compared with an area ratio threshold, to determine the exposure weight of each pixel unit according to the comparison result. If the area ratio of the area of the first-type pixel points in any pixel unit to the area of the pixel unit is greater than the area ratio threshold, the exposure weight of the pixel unit is reset to a first value; and if the area ratio of the area of the first-type pixel points in any pixel unit to the area of the pixel unit is less than or equal to the area ratio threshold, the exposure weight of the pixel unit is reset to a second value. In this embodiment, the area ratio threshold value may be set according to actual requirements, such as 0.8, 0.9, or 0.95.

The first value may be set according to actual requirements, for example, 1, and the corresponding second value may be set to a value different from the first value, for example, 0.

In this embodiment of the present disclosure, when the exposure weight of each pixel unit is determined, whether a pixel unit is located in the target region of the image may also be determined. If any pixel unit is located in the target region of the image and the area ratio of the area of the first-type pixel points in the pixel unit to the area of the pixel unit is greater than the area ratio threshold, the exposure value of the pixel unit is set to a third value. The third value is greater than the first value and different from the second value. For example, when the first value is 1 and the second value is 0, the third value may be set to 3.

After the exposure weight of each pixel unit in the new mask image is obtained, the exposure weight table is constructed based on the exposure weight of each pixel unit. That is, the size of the exposure weight table is the same as the size of the mask data corresponding to the new mask image.

In the image exposure adjustment method provided by this embodiment of the present disclosure, the mask image is scaled down or scaled up to obtain a new mask image, the exposure weight of each pixel unit is determined based on the number ratio of the number of the first-type pixel points in the pixel unit in the new mask image to the total number of pixel points in the pixel unit or based on the area ratio of the area of the first-type pixel points in the pixel unit in the new mask image to the area of the pixel unit, and then an exposure weight table is constructed according to the exposure weight of each pixel unit in the new mask image, laying a foundation for the subsequent exposure value adjustment of the image based on the exposure weight table.

Figure 4:
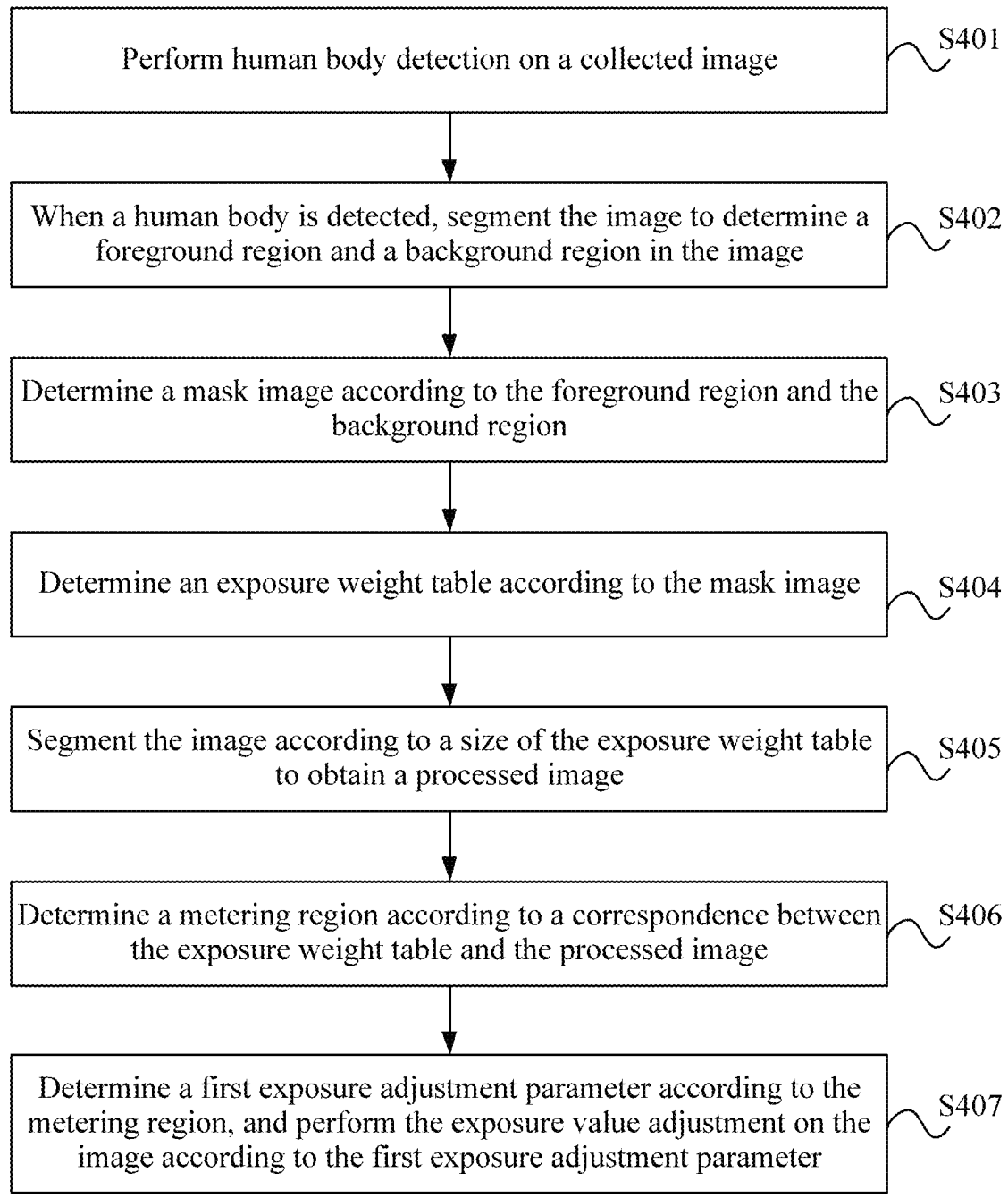
FIG. 4 is a flowchart of another image exposure adjustment method according to an embodiment of the present disclosure.

FIG. 4 is a flowchart of another image exposure adjustment method according to an embodiment of the present disclosure. This embodiment is described on the basis of the preceding embodiments, and the operations related to the step in which the exposure value adjustment is performed on the image according to the exposure weight table are added. As shown in FIG. 4, the method includes S401, S402, S403, S404, S405, S406 and S407.

In S401, human body detection is performed on a collected image.

In S402, when a human body is detected, the image is segmented to determine a foreground region and a background region in the image.

In S403, a mask image is determined according to the foreground region and the background region.

In S404, an exposure weight table is determined according to the mask image.

In S405, the image is segmented according to a size of the exposure weight table to obtain a processed image.

For example, if the size of the exposure weight table is 20*30, the size of the image is also segmented into 20*30 to segment the image into multiple regions, where the multiple regions include a region of interest.

In S406, a metering region is determined according to a correspondence between the exposure weight table and the processed image.

In this embodiment of the present disclosure, the processed image corresponds to multiple pixel units of the exposure weight table so that the metering region in the processed image may be determined according to the exposure weight table.

In the implementation, a pixel unit whose exposure weight is a first value in the processed image may be determined according to the correspondence between the exposure weight table and the processed image, and a region where the pixel unit whose exposure weight is the first value is located is used as the metering region.

For example, if the exposure weights of the $\times 1^{st}$, $\times 2^{nd}$, $\times 3^{rd}$, $\times 4^{th}$, $\times 5^{th}$, $\times 6^{th}$, $\times 7^{th}$, and $\times 8^{th}$ pixel points in the exposure weight table are 1, the eight pixel units are used as the metering region.

In S407, a first exposure adjustment parameter is determined according to the metering region, and the exposure value adjustment is performed on the image according to the first exposure adjustment parameter.

For example, an exposure evaluation value may be calculated based on the metering region, the exposure evaluation value may be compared with an ideal exposure value, and the first exposure adjustment parameter may be determined according to the comparison result. Then the exposure value adjustment is performed on the image according to the first exposure adjustment parameter. The exposure value adjustment may include: the exposure value is increased or the exposure value is decreased.

In the image exposure adjustment method provided by this embodiment of the present disclosure, the image is segmented according to the size of the exposure weight table to obtain a processed image, and a metering region is determined according to the correspondence between the exposure weight table and the processed image, and a first exposure adjustment parameter is determined according to the metering region, to perform the exposure value adjustment on the image according to the first exposure adjustment parameter. Therefore, the problem of low facial recognition performance due to the poor face imaging effect under special conditions is solved. Before facial recognition is performed on the collected image, the exposure weight table is determined based on the human body in the image, and the exposure value adjustment is performed on the image using the exposure weight table, so that the face can be easily detected in the adjusted image, so as to improve the face detection rate, thereby improving the facial recognition performance.

Figure 5:
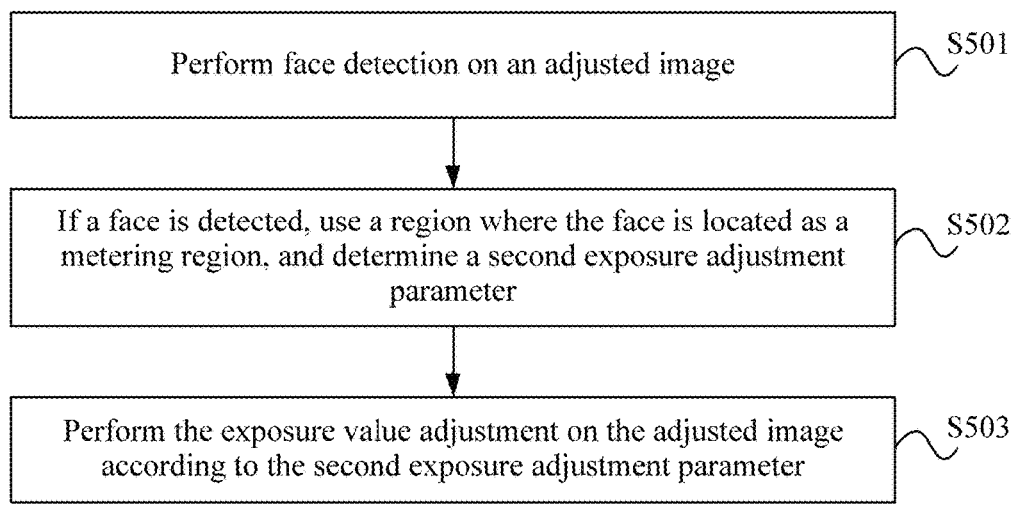
FIG. 5 is a flowchart of another image exposure adjustment method according to an embodiment of the present disclosure.

FIG. 5 is a flowchart of another image exposure adjustment method according to an embodiment of the present disclosure. This embodiment is described on the basis of the preceding embodiments, and the operations related to the step in which after the exposure value adjustment is performed on the image according to the exposure weight table, face detection is performed on an adjusted image and the exposure value adjustment is performed on the detected face are added to describe the face exposure value adjustment. As shown in FIG. 5, the method includes S501, S502 and S503.

In S501, face detection is performed on an adjusted image.

In this embodiment of the present disclosure, the face detection performed on the adjusted image may be achieved using a face detection algorithm or a face detection model. The face detection algorithm refers to any algorithm that can detect faces, and the face detection model refers to any model that can detect faces, which is not limited herein.

In S502, if a face is detected, a region where the face is located is used as a metering region, and a second exposure adjustment parameter is determined.

In S502, the exposure value adjustment is performed on the adjusted image according to the second exposure adjustment parameter.

For example, an exposure evaluation value may be calculated based on the metering region, the exposure evaluation value may be compared with an ideal exposure value, and the second exposure adjustment parameter may be determined according to the comparison result. Then the exposure value adjustment is performed on the adjusted image according to the second exposure adjustment parameter. The exposure value adjustment may include: the exposure value is increased or the exposure value is decreased.

In the image exposure adjustment method provided by this embodiment of the present disclosure, after the image is adjusted according to the exposure weight table, the face detection may also be performed on the adjusted image, when a face is detected, the region where the face is located is used as a metering region, and the second exposure adjustment parameter is determined, to perform the exposure value adjustment on the adjusted image according to the second exposure adjustment parameter, so that the face imaging effect in the re-adjusted image becomes better, thereby facilitating the facial recognition, improving facial recognition performance and enhancing the user experience.

Figure 6:
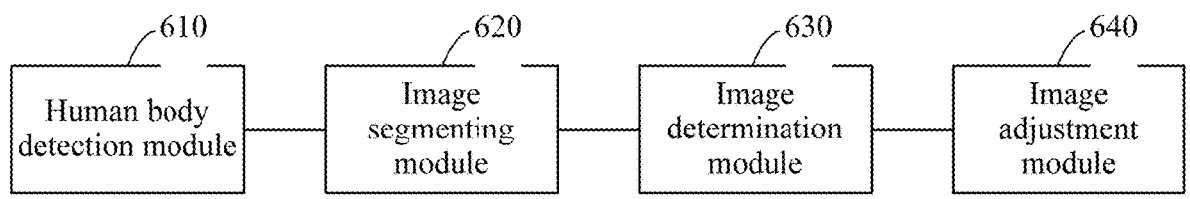
FIG. 6 is a structural schematic diagram of an image exposure adjustment apparatus according to an embodiment of the present disclosure.

FIG. 6 is a structural schematic diagram of an image exposure adjustment apparatus according to an embodiment of the present disclosure. As shown in FIG. 6, the image exposure adjustment apparatus of this embodiment of the present disclosure includes a human body detection module 610, an image segmenting module 620, an image determination module 630 and an image adjustment module 640.

The human body detection module 610 is configured to perform human body detection on a collected image. The image segmenting module 620 is configured to, when a human body is detected, segment the image to determine a foreground region and a background region in the image. The image determination module 630 is configured to determine a mask image according to the foreground region and the background region. The image adjustment module 640 is configured to determine an exposure weight table according to the mask image, and perform exposure value adjustment on the image according to the exposure weight table.

As an implementation mode of this embodiment of the present disclosure, the image segmenting module 620 is configured to segment the image according to a preset Gaussian mixture model to determine the foreground region and the background region in the image.

The image determination module 630 is configured to perform denoising processing and binarization processing on both the foreground region and the background region to obtain the mask image, where the denoising processing includes filtering processing, erosion processing and dilation processing.

As an implementation mode of this embodiment of the present disclosure, the image adjustment module 640 is configured to scale down or scale up the mask image in equal proportion according to a data size of an image signal processor to obtain a new mask image; in a case of scaling down the mask image in equal proportion, count the number of first-type pixel points in each pixel unit in the new mask image, determine a number ratio of the number of first-type pixel points in each pixel unit to the number of total pixel points in the pixel unit, and determine an exposure weight of each pixel unit according to the number ratio, where each pixel unit includes at least two pixel points; and in a case of scaling up the mask image in equal proportion, determine the area of first-type pixel points in each pixel unit in the new mask image, determine an area ratio of the area of first-type pixel points in each pixel units to the area of the pixel unit, and determine an exposure weight of each pixel unit according to the area ratio.

As an implementation mode of this embodiment of the present disclosure, the image adjustment module 640 is further configured to if a number ratio of the number of first-type pixel points in any pixel unit to the number of total pixel points in the pixel unit is greater than a number ratio threshold, reset an exposure weight of the pixel unit to a first value; and if a number ratio of the number of first-type pixel points in any pixel unit to the number of total pixel points in the pixel unit is less than or equal to the number ratio threshold, reset an exposure weight of the pixel unit to a second value.

As an implementation mode of this embodiment of the present disclosure, the image adjustment module 640 is further configured to if an area of first-type pixel points in any pixel unit to an area of the pixel unit is greater than an area ratio threshold, reset an exposure weight of the pixel unit to a first value; and if an area of first-type pixel points in any pixel unit to an area of the pixel unit is less than or equal to the area ratio threshold, reset an exposure weight of the pixel unit to a second value.

As an implementation mode of this embodiment of the present disclosure, the image adjustment module 640 is further configured to segment the image according to a size of the exposure weight table to obtain a processed image; determine a metering region according to a correspondence between the exposure weight table and the processed image; and determine a first exposure adjustment parameter according to the metering region, and perform the exposure value adjustment on the image according to the first exposure adjustment parameter.

As an implementation mode of this embodiment of the present disclosure, the image adjustment module 640 is further configured to determine a pixel unit whose exposure weight is a first value in the processed image according to the correspondence between the exposure weight table and the processed image, and use a region where the pixel unit whose exposure weight is the first value is located as the metering region.

As an implementation mode of this embodiment of the present disclosure, the apparatus further includes a face detection module, a parameter determination module and an exposure value adjustment module. The face detection module is configured to perform face detection on an adjusted image. The parameter determination module is configured to, if a face is detected, use a region where the face is located as a metering region, and determine a second exposure adjustment parameter according to the metering region. The exposure value adjustment module is configured to perform the exposure value adjustment on the adjusted image according to the second exposure adjustment parameter.

The preceding illustration of the image exposure adjustment method embodiments is also suitable for the image exposure adjustment apparatus of this embodiment. The implementation principle of the image exposure adjustment apparatus is similar to those of the method embodiments, and details will not be repeated herein.

In the image exposure adjustment apparatus provided by this embodiment of the present disclosure, the human body detection is performed on a collected image; when a human body is detected, the image is segmented to determine a foreground region and a background region in the image; a mask image is determined according to the foreground region and the background region; and an exposure weight table is determined according to the mask image, and the exposure value adjustment is performed on the image according to the exposure weight table. Therefore, the problem of low facial recognition performance due to the poor face imaging effect under special conditions is solved. Before facial recognition is performed on the collected image, the exposure weight table is determined based on the human body in the image, and the exposure value adjustment is performed on the image using the exposure weight table, so that the face can be easily detected in the adjusted image, so as to improve the face detection rate, thereby improving the facial recognition performance.

As shown in FIG. 700, an embodiment of the present disclosure provides an electronic device 700. The electronic device 700 includes one or more processors 720 and a storage apparatus 710 configured to store one or more programs. When executed by the one or more processors 720, the one or more programs cause the one or more processors 720 to perform the image exposure adjustment method provided by the embodiments of the present disclosure. The image exposure adjustment method includes the steps described below.

Human body detection is performed on a collected image; when a human body is detected, the image is segmented to determine a foreground region and a background region in the image; a mask image is determined according to the foreground region and the background region; and an exposure weight table is determined according to the mask image, and exposure value adjustment is performed on the image according to the exposure weight table.

The processor 720 may also perform the technical schemes of the image exposure adjustment method provided by any one of the embodiments of the present disclosure.

Figure 7:
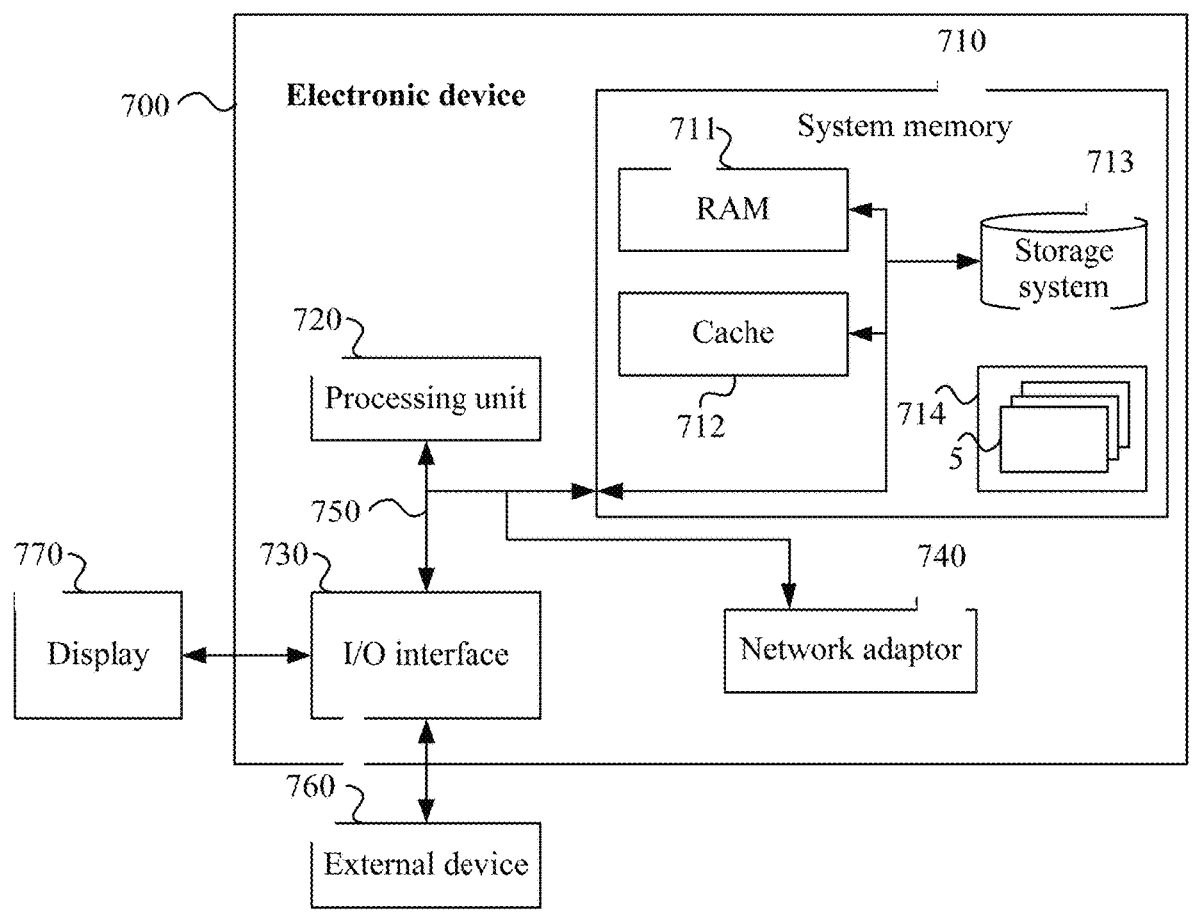
FIG. 7 is a structural schematic diagram of an electronic device according to an embodiment of the present disclosure.

The electronic device 700 shown in FIG. 7 is illustrative and is not intended to limit the function and use scope of embodiments of the present disclosure.

As shown in FIG. 7, the electronic device 700 is shown in the form of a general-purpose computer device. Components of the electronic device 700 may include, but are not limited to, one or more processors 720, a storage apparatus 710, and a bus 750 connecting different system components (including the storage apparatus 710 and the one or more processors 720).

The bus 750 represents one or more of several types of bus architectures, including a memory bus or memory controller, a peripheral bus, an accelerated graphics port, a processor or a local bus using any of a variety of bus architectures. For example, these system architectures include, and are not limited to, an Industry Standard Architecture (ISA) bus, a Micro Channel architecture (MAC) bus, an enhanced ISA bus, a Video Electronics Standards Association (VESA) local bus, and a Peripheral Component Interconnect (PCI) bus.

The electronic device 700 includes multiple computer system readable media. These media may be available media that can be accessed by the electronic device 700. These media include volatile and non-volatile media, and removable and non-removable media.

The storage apparatus 710 may include a computer system readable medium in the form of a volatile memory, such as a random-access memory (RAM) 711 and/or a cache memory 712. The electronic device 700 may include other removable/non-removable, volatile/non-volatile computer system storage media. By way of example only, the storage system 713 may be configured to read from and write to non-removable, non-volatile magnetic media (not shown in FIG. 7, commonly referred to as a "hard disk drive"). Although not shown in FIG. 7, a magnetic disk drive that is configured to read from and/or write to a removable non-volatile magnetic disk (such as a "floppy disk") and an optical disk drive that is configured to read from and/or write to a removable non-volatile optical disk (such as a compact disc read-only memory (CD-ROM), a digital versatile disc-ROM (DVD-ROM), or other optical media) may be provided. In such cases, each drive may be connected to the bus 750 via one or more data media interfaces. The storage apparatus 710 may include at least one program product having a group of program modules (for example, at least one program module). These program modules are configured to perform functions of embodiments of the present disclosure.

A program/utility 714 having a group (at least one) of program modules 715 and may be stored in, for example, the storage apparatus 710, and these program modules 715 include, but are not limited to, an operating system, one or more application programs, other program modules and program data. Each one or a combination of the examples may include the implementation of a network environment. The program modules 715 generally perform functions and/or methods in any of the embodiments of the present disclosure.

The electronic device 700 may communicate with one or more external devices 760 (for example, a keyboard, a pointing terminal, a displayer 770 and the like). The electronic device 700 may also communicate with one or more devices that enable a user to interact with the electronic device 700 and/or communicate with any device (for example, a network card or a modem) that enables the electronic device 700 to communicate with one or more other computing devices. Such communication may be performed through an input/output (I/O) interface 730. Moreover, the electronic device 700 may also communicate with at least one network (for example, a local area network (LAN), a wide area network (WAN), and/or a public network such as the Internet) through a network adapter 740. As shown in FIG. 7, the network adapter 740 communicates with other modules of the electronic device 700 via the bus 750. It is to be understood that although not shown in the figure, other hardware and/or software modules may be used in conjunction with the electronic device 700. The other hardware and/or software modules include, and are not limited to, microcode, a device driver, a redundant processor, an external disk drive array, a redundant arrays of independent disks (RAID) system, a tape driver, a data backup storage system and the like.

The processor 720 executes a program stored in the storage apparatus 710 to perform various functional applications and data processing, for example, to perform the image exposure adjustment method provided by embodiments of the present disclosure.

The preceding illustration of the image exposure adjustment method embodiments is also suitable for the electronic device of this embodiment. The implementation principle of the electronic device is similar to those of the method embodiments, and details will not be repeated herein.

In the electronic device provided by this embodiment of the present disclosure, the human body detection is performed on a collected image; when a human body is detected, the image is segmented to determine a foreground region and a background region in the image; a mask image is determined according to the foreground region and the background region; and an exposure weight table is determined according to the mask image, and the exposure value adjustment is performed on the image according to the exposure weight table. Therefore, the problem of low facial recognition performance due to the poor face imaging effect under special conditions is solved. Before facial recognition is performed on the collected image, the exposure weight table is determined based on the human body in the image, and the exposure value adjustment is performed on the image using the exposure weight table, so that the face can be easily detected in the adjusted image, so as to improve the face detection rate, thereby improving the facial recognition performance.

An embodiment further provides a computer-readable storage medium. The computer-readable storage medium is configured to store a computer program, and the program, when executed by a processor, performs an image exposure adjustment method provided by embodiments of the present disclosure. The method includes the steps described below.

Human body detection is performed on a collected image; when a human body is detected, the image is segmented to determine a foreground region and a background region in the image; a mask image is determined according to the foreground region and the background region; and an exposure weight table is determined according to the mask image, and exposure value adjustment is performed on the image according to the exposure weight table.

The computer-readable storage medium provided by this embodiment of the present disclosure has a computer program stored thereon, and the program, when executed by a processor, performs not only the above-mentioned method operations, but also related operations in the image exposure adjustment method provided by any of the embodiments of the present disclosure.

The computer-readable storage medium of this embodiment of the present disclosure may use any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. Examples of the computer-readable storage medium include (non-exhaustive list): an electrical connection having one or more wires, a portable computer diskette, a hard disk, a random-access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination thereof. Herein, the computer-readable storage medium may be any tangible medium that can contain or store a program for use by or in connection with an instruction execution system, apparatus, or device.

The computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. The computer-readable signal medium may further be any computer-readable medium that is not a computer-readable storage medium and that can communicate, propagate, or transport a program for use by or in connection with an instruction execution system, apparatus, or device.

The program codes included on the computer-readable medium may be transmitted via any appropriate medium, including, but not limited to, a wire, an optical cable, a radio frequency (RF) and the like, or any suitable combination thereof.

Computer program code for performing the operations of the present disclosure may be written in one or more programming languages or combinations thereof. The programming languages include object-oriented programming languages such as Java, Smalltalk, C++, as well as conventional procedural programming languages such as C language or similar programming languages. The program codes may be executed entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What is claimed is:

1. An image exposure adjustment method, comprising:
performing human body detection on a collected image;
in a case where a human body is detected, segmenting the image to determine a foreground region and a background region in the image;
determining a mask image according to the foreground region and the background region; and
determining an exposure weight table according to the mask image, and performing exposure value adjustment on the image according to the exposure weight table;
wherein determining the exposure weight table according to the mask image comprises:
scaling down or scaling up the mask image in equal proportion according to a data size of an image signal processor to obtain a new mask image;
in a case of scaling down the mask image in equal proportion, counting a number of first-type pixel points in each of pixel units in the new mask image, determining a number ratio of the number of first-type pixel points in each of the pixel units to a number of total pixel points in the each of the pixel units, and determining an exposure weight of each of the pixel units according to the number ratio, wherein each of the pixel units comprises at least two pixel points;
in a case of scaling up the mask image in equal proportion, determining an area of first-type pixel points in each of the pixel units in the new mask image, determining an area ratio of the area of first-type pixel points in each of the pixel units to an area of the each of the pixel units, and determining an exposure weight of each of the pixel units according to the area ratio; and
constructing the exposure weight table based on the exposure weight of each of the pixel units.

2. The method according to claim 1, wherein segmenting the image to determine the foreground region and the background region in the image comprises:
segmenting the image according to a preset Gaussian mixture model to determine the foreground region and the background region in the image; and
wherein determining the mask image according to the foreground region and the background region comprises:
performing denoising processing and binarization processing on both the foreground region and the background region to obtain the mask image, wherein the denoising processing comprises filtering processing, erosion processing and dilation processing.

3. The method according to claim 1, wherein determining the exposure weight of the each of the pixel units according to the number ratio comprises:
in a case where a number ratio of a number of first-type pixel points in one of the pixel units to a number of total pixel points in the one of pixel units is greater than a number ratio threshold, resetting an exposure weight of the one of the pixel units to a first value; and
in a case where a number ratio of a number of first-type pixel points in one of the pixel units to a number of total pixel points in the one of the pixel units is less than or equal to the number ratio threshold, resetting an exposure weight of the one of the pixel units to a second value.

4. The method according to claim 1, wherein determining the exposure weight of the each of the pixel units according to the area ratio comprises:
  in a case where an area of first-type pixel points in one of the pixel units to an area of the one of the pixel units is greater than an area ratio threshold, resetting an exposure weight of the one of the pixel units to a first value; and
  in a case where an area of first-type pixel points in one of the pixel units to an area of the one of the pixel units is less than or equal to the area ratio threshold, resetting an exposure weight of the one of the pixel units to a second value.

5. The method according to claim 1, wherein performing the exposure value adjustment on the image according to the exposure weight table comprises:
  segmenting the image according to a size of the exposure weight table to obtain a processed image;
  determining a metering region according to a correspondence between the exposure weight table and the processed image; and
  determining a first exposure adjustment parameter according to the metering region, and performing the exposure value adjustment on the image according to the first exposure adjustment parameter.

6. The method according to claim 5, wherein determining the metering region according to the correspondence between the exposure weight table and the processed image comprises:
  determining a pixel unit whose exposure weight is a first value in the processed image according to the correspondence between the exposure weight table and the processed image, and using a region where the pixel unit whose exposure weight is the first value is located as the metering region.

7. The method according to claim 1, after performing the exposure value adjustment on the image according to the exposure weight table, further comprising:
  performing face detection on an adjusted image;
  in a case where a face is detected, using a region where the face is located as a metering region, and determining a second exposure adjustment parameter according to the metering region; and
  performing the exposure value adjustment on the adjusted image according to the second exposure adjustment parameter.

8. An electronic device, comprising:
  at least one processor; and
  a storage apparatus, configured to store at least one program;
  wherein the at least one program is configured to execute instructions causing the at least one processor to:
  perform human body detection on a collected image;
  in a case where a human body is detected, segment the image to determine a foreground region and a background region in the image;
  determine a mask image according to the foreground region and the background region; and
  determine an exposure weight table according to the mask image, and perform exposure value adjustment on the image according to the exposure weight table;
  wherein the at least one program is configured to execute the instructions causing the at least one processor to determine the exposure weight table according to the mask image in the following way:
  scaling down or scaling up the mask image in equal proportion according to a data size of an image signal processor to obtain a new mask image;
  in a case of scaling down the mask image in equal proportion, counting a number of first-type pixel points in each of pixel units in the new mask image, determining a number ratio of the number of first-type pixel points in each of the pixel units to a number of total pixel points in the each of the pixel units, and determining an exposure weight of each of the pixel units according to the number ratio, wherein each of the pixel units comprises at least two pixel points;
  in a case of scaling up the mask image in equal proportion, determining an area of first-type pixel points in each of the pixel units in the new mask image, determining an area ratio of the area of first-type pixel points in each of the pixel units to an area of the each of the pixel units, and determining an exposure weight of each of the pixel units according to the area ratio; and
  constructing the exposure weight table based on the exposure weight of each of the pixel units.

9. A non-transitory computer-readable storage medium comprising instructions stored thereon to cause at least one processor to:
  perform human body detection on a collected image;
  in a case where a human body is detected, segment the image to determine a foreground region and a background region in the image;
  determine a mask image according to the foreground region and the background region; and
  determine an exposure weight table according to the mask image, and performing exposure value adjustment on the image according to the exposure weight table;
  wherein the instructions cause the at least one processor to determine the exposure weight table according to the mask image in the following way:
  scaling down or scaling up the mask image in equal proportion according to a data size of an image signal processor to obtain a new mask image;
  in a case of scaling down the mask image in equal proportion, counting a number of first-type pixel points in each of pixel units in the new mask image, determining a number ratio of the number of first-type pixel points in each of the pixel units to a number of total pixel points in the each of the pixel units, and determining an exposure weight of each of the pixel units according to the number ratio, wherein each of the pixel units comprises at least two pixel points;
  in a case of scaling up the mask image in equal proportion, determining an area of first-type pixel points in each of the pixel units in the new mask image, determining an area ratio of the area of first-type pixel points in each of the pixel units to an area of the each of the pixel units, and determining an exposure weight of each of the pixel units according to the area ratio; and
  constructing the exposure weight table based on the exposure weight of each of the pixel units.

10. The electronic device according to claim 8, wherein the at least one program is configured to execute the instructions causing the at least one processor to segment the image to determine the foreground region and the background region in the image in the following way:
  segmenting the image according to a preset Gaussian mixture model to determine the foreground region and the background region in the image; and
  wherein the at least one program is configured to execute the instructions causing the at least one processor to determine the mask image according to the foreground region and the background region in the following way:
performing denoising processing and binarization processing on both the foreground region and the background region to obtain the mask image, wherein the denoising processing comprises filtering processing, erosion processing and dilation processing.

11. The electronic device according to claim 10, wherein the at least one program is configured to execute the instructions causing the at least one processor to determine the exposure weight of the each of the pixel units according to the number ratio in the following way:
in a case where a number ratio of a number of first-type pixel points in one of the pixel units to a number of total pixel points in the one of pixel units is greater than a number ratio threshold, resetting an exposure weight of the one of the pixel units to a first value; and
in a case where a number ratio of a number of first-type pixel points in one of the pixel units to a number of total pixel points in the one of the pixel units is less than or equal to the number ratio threshold, resetting an exposure weight of the one of the pixel units to a second value.

12. The electronic device according to claim 8, wherein the at least one program is configured to execute the instructions causing the at least one processor to determine the exposure weight of the each of the pixel units according to the area ratio in the following way:
in a case where an area of first-type pixel points in one of the pixel units to an area of the one of the pixel units is greater than an area ratio threshold, resetting an exposure weight of the one of the pixel units to a first value; and
in a case where an area of first-type pixel points in one of the pixel units to an area of the one of the pixel units is less than or equal to the area ratio threshold, resetting an exposure weight of the one of the pixel units to a second value.

13. The electronic device according to claim 8, wherein the at least one program is configured to execute the instructions causing the at least one processor to perform the exposure value adjustment on the image according to the exposure weight table in the following way:
segmenting the image according to a size of the exposure weight table to obtain a processed image;
determining a metering region according to a correspondence between the exposure weight table and the processed image; and
determining a first exposure adjustment parameter according to the metering region, and performing the exposure value adjustment on the image according to the first exposure adjustment parameter.

14. The electronic device according to claim 13, wherein the at least one program is configured to execute the instructions causing the at least one processor to determine the metering region according to the correspondence between the exposure weight table and the processed image in the following way:
determining a pixel unit whose exposure weight is a first value in the processed image according to the correspondence between the exposure weight table and the processed image, and using a region where the pixel unit whose exposure weight is the first value is located as the metering region.

15. The electronic device according to claim 8, after performing the exposure value adjustment on the image according to the exposure weight table, the at least one program being configured to execute the instructions causing the at least one processor further to:
perform face detection on an adjusted image;
in a case where a face is detected, use a region where the face is located as a metering region, and determine a second exposure adjustment parameter according to the metering region; and
perform the exposure value adjustment on the adjusted image according to the second exposure adjustment parameter.

16. The non-transitory computer-readable storage medium according to claim 9, wherein the instructions cause the at least one processor to segment the image to determine the foreground region and the background region in the image in the following way:
segmenting the image according to a preset Gaussian mixture model to determine the foreground region and the background region in the image; and
wherein the instructions cause the at least one processor to perform, determining the mask image according to the foreground region and the background region in the following way:
performing denoising processing and binarization processing on both the foreground region and the background region to obtain the mask image, wherein the denoising processing comprises filtering processing, erosion processing and dilation processing.

17. The non-transitory computer-readable storage medium according to claim 9, wherein the instructions cause the at least one processor to determine the exposure weight of the each of the pixel units according to the number ratio in the following way:
in a case where a number ratio of a number of first-type pixel points in one of the pixel units to a number of total pixel points in the one of pixel units is greater than a number ratio threshold, resetting an exposure weight of the one of the pixel units to a first value; and
in a case where a number ratio of a number of first-type pixel points in one of the pixel units to a number of total pixel points in the one of the pixel units is less than or equal to the number ratio threshold, resetting an exposure weight of the one of the pixel units to a second value.

18. The non-transitory computer-readable storage medium according to claim 9, wherein the instructions cause the at least one processor to determine the exposure weight of the each of the pixel units according to the area ratio in the following way:
in a case where an area of first-type pixel points in one of the pixel units to an area of the one of the pixel units is greater than an area ratio threshold, resetting an exposure weight of the one of the pixel units to a first value; and
in a case where an area of first-type pixel points in one of the pixel units to an area of the one of the pixel units is less than or equal to the area ratio threshold, resetting an exposure weight of the one of the pixel units to a second value.

19. The non-transitory computer-readable storage medium according to claim 9, wherein the instructions cause the at least one processor to perform the exposure value adjustment on the image according to the exposure weight table in the following way:
segmenting the image according to a size of the exposure weight table to obtain a processed image;

determining a metering region according to a correspondence between the exposure weight table and the processed image; and determining a first exposure adjustment parameter according to the metering region, and performing the exposure value adjustment on the image according to the first exposure adjustment parameter.

20. The non-transitory computer-readable storage medium according to claim 19, wherein the instructions cause the at least one processor to determine the metering region according to the correspondence between the exposure weight table and the processed image in the following way:

determining a pixel unit whose exposure weight is a first value in the processed image according to the correspondence between the exposure weight table and the processed image, and using a region where the pixel unit whose exposure weight is the first value is located as the metering region.

* * * * *